Figure 1:
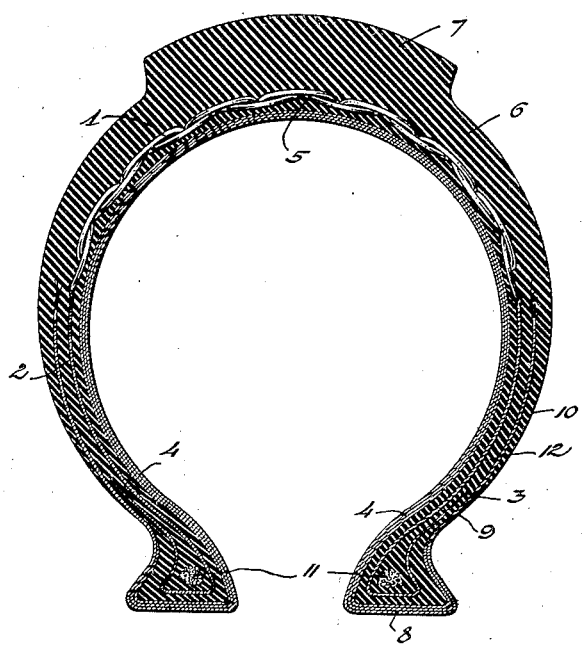

J. TROST.
ARMORED TIRE.
APPLICATION FILED MAY 29, 1922.

1,434,571.

Patented Nov. 7, 1922.

Inventor:
John Trost
By
Attorney

Patented Nov. 7, 1922.

1,434,571

UNITED STATES PATENT OFFICE.

JOHN TROST, OF DETROIT, MICHIGAN.

ARMORED TIRE.

Application filed May 29, 1922. Serial No. 564,351.

*To all whom it may concern:*

Be it known that I, JOHN TROST, a citizen of the United States of America, residing at Detroit, in the county of Wayne and State of Michigan, have invented certain new and useful Improvements in Armored Tires, of which the following is a specification, reference being had therein to the accompanying drawings.

This invention relates to pneumatic tires for automobiles and has for its principal object the provision of an armor for the outer casing which will prevent cutting or puncturing of the inner tube.

A further object of the invention is to provide a form of armor which will not be injurious to the inner tube.

A still further object of the invention is to provide an armor for an outer casing which will have sufficient flexibility to prevent injury to the sides of the casing at the portions where the greatest amount of bending occurs.

A still further object of the invention is the provision of an armor composed of a plurality of metallic pieces provided with means holding the pieces separated from each other to an extent such that injurious friction between the pieces of metal will not not occur during the use of the tire.

Other and further objects will appear in connection with the description, reference being had to the drawing in which—

Figure 2:
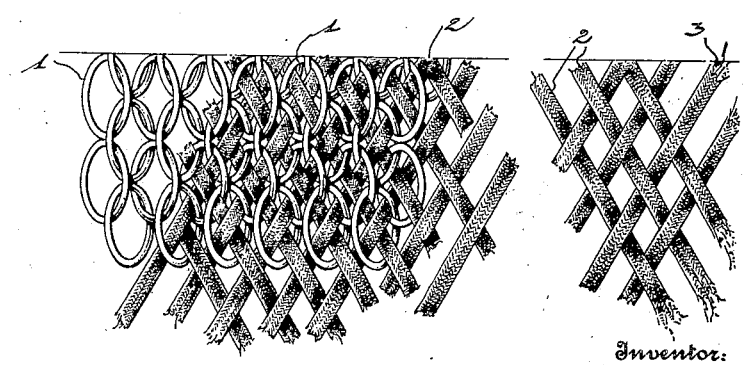

Figure 1 is a transverse section through an outer casing constituting one embodiment of my invention, and Fig. 2 is a plan view of a fragment of the armor.

The layer of armor used in this tire casing is constructed of a network of interlacing metallic rings 1 arranged substantially parallel to each other, a network of interlacing cords 2 being arranged diagonally through the interlaced rings in such manner that the cords separate the rings at the points at which they would normally lie in contact. The cords 2 are saturated with rubber before they are interwoven with the rings and when the assemblage of cords and rings has its interspaces filled with rubber vulcanized in place, the rings are almost entirely out of contact with each other. The network of cords is substantially twice as wide as the central band of interlaced rings and the ends of the cords are frayed out as indicated at 3.

In assembling the casing a plurality of sheets of canvas 4 are placed upon a core, the canvas being continuous from side to side of the casing. Thin layers of rubber are placed between the successive layers of canvas and upon the outer surface of the final layer is placed a thicker layer of rubber indicated at 5. Upon this layer 5 is placed the armor section with the central portion of the band of metal links at the center of the tread of the casing. Upon the armor section is placed the outer layer of rubber 6 with the usual anti-skid knobs 7 in the center of the outer periphery.

In the form of casing shown in Fig. 1, the inner layers of canvas 4 will extend outward around the bottom portion of the beads at each free edge of the casing as indicated at 8 and thence around the outer portion of the casing as indicated at 9, being embedded within the body of the tire at their end portions and protected by an outer layer of rubber 10. The cord portion of the armor extends from the metallic ring section substantially parallel with the canvas layers 4 into the bead portion of the casing which will normally have a cable 11 centrally thereof for greater strength. The cord section will extend around this cable parallel with the section 8 of the canvas and thence outward through the body of the bead, the frayed ends 3 terminating within the body of rubber 12 lying between the canvas section 9 and the body of the cord section. The various layers of canvas, rubber and armor are vulcanized together in the ordinary manner to form a tire casing which is highly resilient from the bead section to the metallic portion of the armor.

The closely interlacing rings of steel having the interlaced web of cords extending therethrough affords a protecting layer which will be substantially impervious to any object over which the tire may pass. The cords being first impregnated with rubber and then inserted between the intersecting portions of the rings, hold the rings apart during the application of the rubber and its vulcanization so that when the tire is completed, each metallic ring is substantially completely surrounded by rubber and the friction which has hitherto been so objectionable a feature of armored tires is substantially completely obviated. The interwoven fabric of cords would in itself be a substantial armor and a highly efficient reinforcement for the casing, but with the central portion of the interwoven fabric reinforced by the interlacing steel rings passing through the interstices and every space filled with rubber, the portion of the tire most susceptible to puncture is guarded by interlacing metal practically non-puncturable.

This invention is in the nature of an improvement upon the tire armor disclosed in United States Patent No. 895,821 issued August 11, 1908, to George Wilmot, Jr. It differs therefrom by the omission of the cables at the edges, by the limitation of the metallic armor to the central portion only of the fabric and by the location of the armor strip within the body of the casing instead of between the casing and the inner tube.

In the patented structure the wire rings at the edges of the armor strip adjacent to the rim of the tire interfered with the flexibility of the tire, and in the absence of the rubber interposed between the metallic rings, the friction occurring when the tire was in use resulted in too rapid wear and in injury to the inner tube.

In the present invention these difficulties have been completely overcome and a tire constructed in the manner herein described has been given a thorough test with entirely satisfactory results.

It will be obvious that many changes may be made in the size and proportion of parts and various details of construction without departing from the spirit of my invention or sacrificing the advantages thereof. I wish therefore to claim the invention in any of its forms or modifications within the legitimate and valid scope of the appended claims.

I claim:—

1. An automobile tire casing comprising a tread portion intermediately between two bead portions and an armor for said tread portion consisting of a plurality of interengaging metallic rings, each ring being separated from an adjacent ring by a cord impregnated with rubber, said cords being interlaced to form a network with the end portions of the cords extending beyond the interengaging rings, the tread portion having a heavy layer of rubber within which the rings and network are embedded and the end portions of the cords beyond the rings extending from the tread portion of the casing into the bead portions thereof.

2. An automobile tire comprising a relatively thick tread portion and two side portions terminating in reinforced bead portions, an armor portion comprising a plurality of interengaging metallic rings embedded within said tread portion, said rings having a plurality of cords interlaced therewith to form a network, the ends of said cords extending beyond the interlacing rings transversely through the side portions into said bead portions.

3. An automobile tire comprising a vulcanized rubber casing having molded therein an armor strip made up of a metallic fabric composed of rings which interlock both longitudinally and laterally, said rings being arranged in the center of that portion of the casing which will form the tread, and a plurality of interlacing cords arranged diagonally through the rings between points of intersection thereof, said cords extending to the edges of said casing which engage within the rim of a wheel.

4. An armor for automobile tires embodying an enclosed strip of interengaging metallic rings in the tread portion, said rings being separated at crossing points by diagonally arranged cords, said cords being interlaced with each other and extending beyond the rings to the bead portions, said rings and cords being vulcanized within a body of rubber and reinforcing fabric vulcanized to said rubber to form a lining portion.

In testimony whereof I affix my signature in presence of two witnesses.

JOHN TROST.

Witnesses:
  G. L. TERNA,
  ARTHUR MINNICK.